United States Patent [19]

Cunningham et al.

[11] Patent Number: 5,262,190

[45] Date of Patent: Nov. 16, 1993

[54] EXTRUDED MEAT-BASED SNACK FOOD AND METHOD FOR PREARING SAME

[75] Inventors: Frank E. Cunningham, Leonardville; Paul E. Neumann, Manhattan; Gordon R. Huber, Sabetha, all of

[73] Assignee: Kansas State University Research Foundation, Manhattan, Kans.

[21] Appl. No.: 17,368

[22] Filed: Feb. 12, 1993

Related U.S. Application Data

[63] Continuation-in-part of Ser. No. 811,951, Dec. 23, 1991, abandoned.

[51] Int. Cl.⁵ .............. A23J 3/26; A23L 1/10; A23P 1/12; A23P 1/14
[52] U.S. Cl. .................. 426/549; 426/446; 426/516; 426/644; 426/646; 426/805
[58] Field of Search ........... 426/549, 516, 644, 646, 426/805, 448

[56] References Cited

U.S. PATENT DOCUMENTS

| | | | |
|---|---|---|---|
| 3,908,025 | 9/1975 | Miller | 426/623 |
| 4,011,345 | 5/1977 | Bartsch | 426/805 |
| 4,020,187 | 4/1977 | McCulloch et al. | 426/623 |
| 4,055,681 | 10/1977 | Balaz et al. | 426/805 |
| 4,104,407 | 8/1978 | Stringer et al. | 426/805 |
| 4,225,630 | 9/1980 | Pitchon | 426/805 |
| 4,418,086 | 11/1983 | Marino et al. | 426/805 |
| 4,524,081 | 6/1985 | Bansal | 426/805 |
| 4,900,572 | 2/1990 | Repholz et al. | 426/805 |
| 5,026,572 | 6/1991 | Neiberger | 426/805 |
| 5,045,339 | 9/1991 | Ducharme | 426/805 |

OTHER PUBLICATIONS

Maurer, A. J., 1979, Extrusion and texturizing in the manufacture of poultry products, Food Technology 33:48.

Anonymous, 1975, Vegetable protein fiber adds texture to mechanically deboned meat. Food Processing 36:48.

*Primary Examiner*—Jeanette Hunter
*Assistant Examiner*—Mary S. Mims
*Attorney, Agent, or Firm*—Hovey, Williams, Timmons & Collins

[57] ABSTRACT

A high protein, shelf-stable, meat-containing snack product is provided which is in the form of a cellular, expanded extrudate which can be dried and flavored to yield nutritional snacks having excellent organoleptic properties. The final snack contains at least about 5% by weight meat (most preferably mechanically deboned poultry meat), and at least about 50% by weight wheat. The invention also comprehends a fabrication method wherein an initial mixture containing at least about 15% by weight meat and at least about 50% by weight wheat flour are mixed and passed through an extruder under time and temperature conditions to yield an expanded, cellular extrudate having the general appearance of a bread stick.

28 Claims, 1 Drawing Sheet

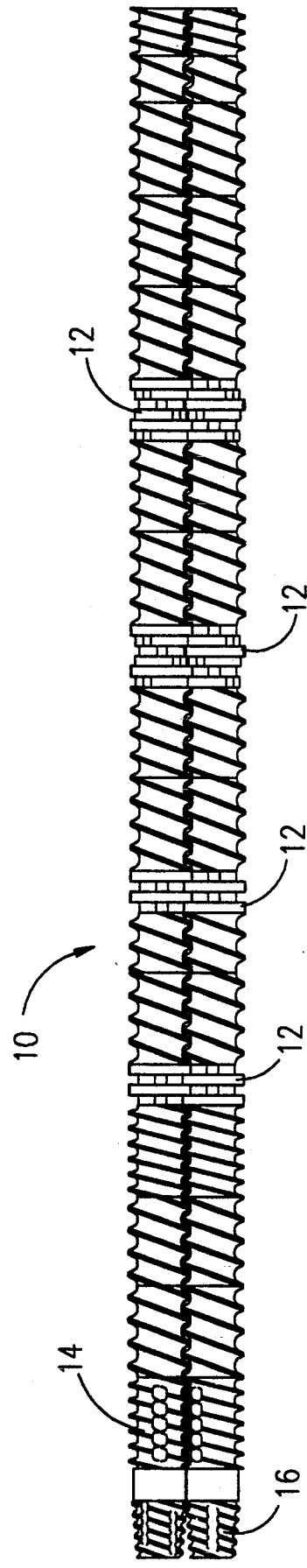

EXTRUDED MEAT-BASED SNACK FOOD AND METHOD FOR PREARING SAME

This application is a continuation-in-part of identically titled application Ser. No. 07/811,951, filed Dec. 23, 1991 now abandoned.

BACKGROUND OF THE INVENTION

1. Field of the Invention

The present invention is broadly concerned with an improved, high protein, shelf-stable, crisp extruded snack product characterized by relatively high meat content and improved organoleptic properties. More particularly, the invention is concerned with such a snack product, and a method of fabricating the same, wherein the product is a cellular, expanded, extruded snack made from a starting mixture including at least about 15% by weight meat (e.g., mechanically deboned poultry meat) and at least about 50% by weight wheat. In fabrication procedures, an initial mixture comprising meat and wheat flour is passed through an extrusion cooker under conditions to yield the desired expanded product. The extrudate is then dried and a flavoring is topically applied thereto.

2. Description of the Prior Art

The quantity of snack products produced and consumed in the United States and around the world is of immense proportions. Many such snacks are produced using high capacity extrusion equipment, and are farinaceous in character (e.g., corn chips). While the consumption of these products is large and widespread, there is a definite concern about the lack of quality nutrition inherent in these products. That is to say, typical snack products are relatively high in calories and fat, and correspondingly low in protein. As a consequence, health conscious consumers are seeking alternate snack products not having these nutritional drawbacks.

The poultry industry generates an enormous amount of an under-utilized protein source in the form of mechanically deboned poultry meat (MDPM). This product, obtained from mechanical deboners in chicken or turkey processing plants, is in the form of an emulsion. Because of this factor, this poultry meat is most often used in emulsion type operations, such as bolognas and franks. It has been suggested to mix MDPM with soy flour and form a chicken loaf. Moreover, attempts have been made in the past to produce extruded meat-vegetable protein sticks and sausages, see "Extrusion and Texturizing in the Manufacture of Poultry Products," *Food Technology*, April, 1979, pp. 48-51. However, these products are not generally considered as snacks, and do not have the desirable organoleptic properties demanded by consumers in the context of snack products.

Dry and semi-moist pet food products have been proposed in the past which include meat and meat by-products. However, these products are of the high-energy, high-fat variety having relatively large quantities of fat therein. For example, U.S. Pat. No. 4,020,187 describes a dry pet food having at least about 7½% fat. In addition, a number of other references describe meat-containing extruded pet foods having added fat in addition to fat inherent in the normal ingredients thereof; when total fat levels are considered, they are on the order of 5-10% or greater. See, e.g., U.S. Pat. Nos. 4,011,345, 4,055,681, 4,524,081, 4,104,407, and 3,908,025.

Extruded human food products have also been produced in the past which include various meat products. Here again, however, these prior products are characterized by relatively high fat contents, making them unsuitable for diet-conscious consumers. At the same time, these products cannot provide desirable organoleptic products for a snack food. See, e.g., U.S. Pat. Nos. 5,026,572, 4,418,016, 4,900,572, and 4,225,630.

SUMMARY OF THE INVENTION

The present invention overcomes the problems outlined above, and provides an improved, high protein, meat-based snack food product in the form of an expanded cellular body defined by a multitude of cell-defining walls. The material making up these cell walls includes at least about 5% by weight meat and at least 50% by weight wheat. The products of the invention are similar in appearance to bread sticks, and have a similar degree of crispness. In order to improve the eating quality of the snack products, they are advantageously coated with topically applied flavorings of various types, e.g., beef, poultry, pork, barbecue, cheese, taco and nacho flavorings.

The products of the invention are produced using extrusion apparatus, and the method involves first forming a mixture including at least about 15% by weight meat and at least 50% by weight wheat flour. This mixture is then passed into and through an extruder equipped with a flighted internal screw and an endmost die. During passage through the extruder barrel, the mixture is subjected to an elevated temperature of up to about 280° F. and superatmospheric pressures of up to about 2500 psig. Thereafter, the product is extruded through an endmost die having openings of desired shape in order to create an extrudate. This extrudate is then normally dried, whereupon flavorings may be topically applied. At this point, the products may be further toasted to enhance the crispness thereof.

BRIEF DESCRIPTION OF THE DRAWING

The single figure is a schematic representation of the most preferred extruder screw configuration used with a twin screw extruder in the fabrication of the products of the invention.

DETAILED DESCRIPTION OF THE PREFERRED EMBODIMENTS

The final extruded snack products of the invention are of expanded cellular construction and are characterized by a plurality of cell-defining walls. As indicated, the walls are made up of material including at least about 5% by weight meat, and more preferably from about 7.5-15% by weight meat. Particularly preferred snack products have about 10% by weight meat. The meat products can be selected from a variety of sources, but for reasons of costs and processability, the meat is selected from the group consisting of beef, pork and poultry. Particularly preferred are the mechanically deboned poultry products.

Such extruded products are further characterized as having a moisture content of from about 1-10% by weight, more preferably from about 2-6% by weight, a specific gravity of from about 0.08 to 0.15, and a bulk density of from about 5-9 pounds per cubic foot. Moreover, they exhibit an Instron compressibility rating of from about 1.0-5.0 kilograms force, as measured in a Warner-Bratzler shear cell, and have a water activity of less than 0.65 and preferably from about 0.2-0.4. Finally, the products of the invention have a protein content of from about 5-25% by weight, more preferably from about 10-15% by weight, and an as-extruded fat content (i.e., as the product exists after extrusion but before application of any topical flavorings or the like) of from about 0-20% by weight, more preferably up to about 4% by weight, and most preferably below 3% by weight by weight.

The topical flavorings on the snack products of the invention are normally applied by spraying, and the quantity used typically ranges from about 0.1 to 0.5% by weight of the total product. After such flavor coating, the products may be toasted using an impingement oven or similar device, in order to brown the surface of the snack pieces and enhance the crispness thereof.

The snacks may assume virtually any desired shape which can be obtained via extrusion processing. For example, the products may be in the form of rods or cubes, and typically have a length of at least about ⅜ inch. Alternately, the products may be in the form of rings or tubes.

The extrusion process for fabricating the snack products of the invention involves first forming a mixture including at least about 15% by weight meat (such fraction including the normal moisture content of the meat being employed), and more preferably from about 20-40% by weight meat, and most preferably about 25% by weight meat. The starting mixture also includes at least about 50% by weight wheat flour, and more preferably from about 60-80% by weight thereof. No additional moisture is required to be added to the starting mixture, if use is made of MDPM as a meat source. Advantageously, the starting ingredients may be mixed in a preconditioner, without steam or water addition; and the residence time in the preconditioner is preferably from about 60-180 seconds. In any event, the total moisture content of the mixture fed to the extruder should be from about 15-40% by weight, and more preferably from about 20-30% by weight. Optional ingredients which may be added to the starting mixture include salt, surfactant, dextrose, fiber, antioxidants and sodium tripolyphosphate. These are normally present in very minor amounts of less than 5% by weight.

This mixture is then fed to the inlet of an extruder, most advantageously a twin screw extruder of the type commercialized by Wenger Manufacturing, Inc. of Sabetha, Kans. As described previously, the starting ingredients for the mixture may be fed to a preconditioner apparatus to insure homogeneity of the final mixture, with the latter then being directed to the extruder inlet.

During passage through the extruder, the mixture is subjected to elevated temperatures and pressures in order to cook and denature the meat protein of the mixture, and to form a final product. The maximum temperature of the mixture in the extruder barrel should be up to about 280° F., more preferably from about 180°-250° F., and most preferably from about 210°-240° F. The maximum pressure achieved in the extruder barrel should be up to about 2500 psig, and more preferably from about 500-1500 psig. The residence time of the mixture in the extruder barrel should be from about 10-60 seconds, and more preferably from about 15-45 seconds.

As the material emerges from the endmost extruder die, it is normally cut via a rotating knife, with the knife speed determining product length. Thereafter, the cut extrudate is directed to a dryer for drying the product down to essentially the final product moisture. A conventional multiple-stage dryer may be used to good effect for this purpose, with drying conditions being variable.

After drying, the product may be flavored by the topical application of liquid or solid flavoring such as described previously. Thereafter, if desired, the product may be subjected to a toasting process.

The products of the invention exhibit a number of important properties making them eminently suited as desirable snacks. For example, they are relatively high in protein and low in fat, and are therefore nutritionally advantageous. Moreover, because of the low moisture and water activity inherent in the products, there is virtually no possibility of microbial growth. As a consequence, the products of the invention, when properly packaged, should remain completely edible for many months. Finally, when use is made of low cost (at present prices about 17 cents per pound) MDPM as a meat source, a high quality meat snack is provided which can be flavored to meet the dictates of consumer preference while still giving enhance nutritional benefits. These advantages are present in the invention largely because of the relatively high wheat flour content of the product, coupled with the relatively low fat content thereof.

The following examples set forth a series of extrusion runs for the fabrication of snack products in accordance with the invention. It is to be understood that these examples are provided by way of illustration only, and nothing therein should be taken as a limitation upon the overall scope of the invention.

EXAMPLE I

In this series of tests, two starting mixtures were employed, namely a wheat flour based mixture having 97% by weight Wisdom wheat flour, 1% by weight salt, 0.5% by weight Dimodan P.V. surfactant and 1.5% by weight dextrose; and a meat mixture including 93.98% by weight mechanically deboned chicken product (surimi), 5% by weight carboxymethyl cellulose (fiber), 0.5% by weight sodium tripolyphosphate, 0.5% by weight chicken flavoring, and 0.02% by weight BHT antioxidant.

In extrusion mixture No. 1, 75% by weight of the wheat mixture was added to 25% by weight of the meat mixture; in extrusion mixture No. 2, 73.16% by weight of the wheat mixture was added to 26.34% by weight of the meat mixture, and an additional 0.50% by weight of chicken flavoring was added.

In Runs 1 and 2, the respective extrusion mixtures were fed first to a conventional preconditioner (mixing cylinder) and then into the inlet of a Wenger Model TX-52 twin screw extruder commercialized by Wenger Manufacturing, Inc. of Sabetha, Kans. In Run 3, no preconditioner was used, and the material as fed directly to the TX-52. This type of extruder is described in U.S. Pat. No. 4,875,847, which is incorporated by reference herein. The TX-52 extruder was equipped with a total of six heads, with heads 2-6 being jacketed for the introduction of heat exchange media in order to indirectly heat or cool the material passing through the extruder. The media included water (W), warm water (W/temp), or hot oil (HO/temp). The outlet end of the extruder was provided with a die spacer and a final apertured die. The internal screw of the extruder was equipped with two sets of spaced shearlock elements and a final, triple flighted conical screw adjacent the die.

The specific die employed consisted of a Wenger Model No. 74010-271 backup die plate, together with a Wenger Model No. 55372-101 final die insert holder equipped with a pair of Wenger Model No. 74010-466 stainless steel die inserts. The backup die plate has two sets of circularly arranged apertures (8 per set, 5/32" diameter) respectively oriented in alignment with each of the extruder screws. The insert holder includes a pair of insert-receiving openings, while each insert includes a conical passage leading to a final die opening having a 5/32" diameter. This die arrangement is typically used for breading products.

The extrusion conditions recorded for this series of runs are set forth below:

| Extruder: TX-52 | RUN #1 | RUN #2 | RUN #3 |
|---|---|---|---|
| Extruder Screw Speed-RPM | 406 | 403 | 403 |
| Temp/Control 2nd Head | W | W | W |
| Temp/Control 3rd Head | W | W | W/63° F. |
| Temp/Control 4th Head | HO | HO | HO/87° F. |
| Temp/Control 5th Head | HO | HO | HO/128° F. |
| Temp/Control 6th Head | W/154° F. | W/149° F. | W/152° F. |
| Water to Extruder (Brooks) | 25 | 25 | 25 |
| Extruder % Load | 25% | 25% | 30% |
| Feeder RPM | 11 | 11 | 13 |
| Mixing Cyl RPM | 305 | 305 | |
| Pressure Head #5 PSIG | 100 | 100 | 100 |
| Extruder Stability | Good | Good | Good |
| Product Stability | Good | Good | Good |
| Formula No. | 1 | 1 | 2 |

EXAMPLE II

In another series of runs, the extrusion mixture No. 1 described above was used, except that after drying, the extruded products were spray-coated with external flavorings, namely pork (Runs 1 and 2), chicken (Run 3) and beef (Run 4).

The starting extrusion mixtures were fed to a preconditioner and then into the inlet of a Model TX-52 twin screw extruder, and in this instance having a total of nine heads, of which Nos. 2-9 were jacketed for introduction of heat exchange media. The internal screw included a conical terminal screw section and was configured for a bread stick-type product. The final die was identical to that described in connection with Example I. The data derived from this series of runs is set forth below.

|  |  | RUN #1 | RUN #2 | RUN #3 | RUN #4 |
|---|---|---|---|---|---|
| Raw Material Rate | PPH | 120.00 | 120.00 | 120.00 | 120.00 |
| Feed Screw Speed | RPM | 11 | 11 | 11 | 11 |
| Mixing Cylinder Speed | RPM | 300 | 300 | 300 | 298 |
| Moisture Entering Extruder | MCWB | 20.70 |  | 23.44 | 23.21 |
| Extruder Shaft Speed | RPM | 400 | 397 | 396 | 398 |
| Motor Load | % | 40 | 30 | 25 | 31 |
| Water Flow to Extruder | PPM | 0.090 | 0.500 | 0.400 | 0.350 |
| Control/Temperature 2nd Head | °F. | W/84 | W/86 | W/84 | W/86 |
| Control/Temperature 3rd Head | °F. | W/84 | W/86 | W/84 | W/86 |
| Control/Temperature 4th Head | °F. | HO/106 | HO/118 | HO/127 | HO/136 |
| Control/Temperature 5th Head | °F. | HO/111 | HO/126 | HO/133 | HO/142 |
| Control/Temperature 6th Head | °F. | HO/108 | HO/86 | HO/176 | HO/86 |
| Control/Temperature 7th Head | °F. | W/70 | W/75 | W/70 | W/72 |
| Control/Temperature 8th Head | °F. | W/70 | W/75 | W/70 | W/72 |
| Control/Temperature 9th Head | °F. | W/158 | W/147 | W/140 | W/144 |
| Head/Pressure | PSIG | 8/550 | 8/300 | 8/250 | 8/300 |
| Head/Pressure | PSIG | 9/900 | 9/600 | 9/500 | 9/600 |
| Knife Drive Speed | RPM | 6 | 7 | 7 | 7 |
| Extrudate Moisture | MCWB | 16.48 | 26.74 | 32.01 | 23.50 |
| Final Product Description | | Pork Stick | Pork Stick | Chicken Stick | Beef Stick |

The extrudate from these Runs was flavor-coated and then dried in a multiple pass dryer using an air temperature of 280° F., with a retention time, first pass, of 7.5 minutes; a retention time, second pass, of 7.5 minutes; and a cooler retention time of 3.8 minutes. The moisture analyses of Run 1 indicated that the product exiting the preconditioner had a moisture content of 20.7% by weight MCWB (moisture content, wet basis); the extrudate prior to coating had a moisture content of 16.8% by weight MCWB; and the product after coating had a moisture content of 3.85% by weight MCWB. In the case of Run 2, the extrudate had a moisture content of 26.74% by weight MCWB and a moisture content after coating of 12.21% by weight MCWB. In Run 3, the material from the preconditioner had a moisture content of 23.44% by weight MCWB, the extrudate had a moisture content of 32.01% by weight MCWB, and the product after coating had a moisture content of 11.33% by weight MCWB. Finally, in the case of Run 4, the moisture contents recorded after preconditioning, extrusion and coating were respectively 23.23%, 23.50% and 8.71% by weight MCWB.

The Run 1 product exhibited a very large cell structure and was cut into 2.5 inch pieces as it emerged from the die. The Run 2 product exhibited an excessively hard bite, indicating the need for changing the moisture content of the material in the barrel. Runs 3 and 4 exhibited only minimal expansion.

EXAMPLE III

In a final series of tests, a formula identical with extrusion mixture No. 1 described above and using chicken flavoring was used, with various types of wheat being employed. The purpose of these tests was to determine which wheat variety gave the most optimum snack product. It was determined that soft white winter wheat gave the best product, although all wheats tested gave an acceptable snack.

The most preferred Run from this series of tests was conducted using a nine head Wenger TX-52 twin screw extruder and a Wenger Model MDL 1 DC preconditioner configured for relatively long retention time. The drawing figure is a schematic representation of the preferred dual screw configuration used in the TX-52. As shown, each screw 10 includes a series of axially interconnected screw sections with a number of spaced shearlock element sets 12. A cut flight screw section 14 is also included, together with a high shear cone nose screw section 16. The die assembly was a Wenger back-up assembly, including a Model 55361-001 back-up die plate and 55372-113 final die insert holder. A loop die ($\frac{3}{4}$" diameter insert presenting an annular opening having an outer diameter of 5.75 mm, a pin diameter of 3.15 mm and an open area of 18.17 sq. mm) formed a part of the die assembly giving an annular product. The extrusion and drying conditions recorded for this preferred run are set forth below:

| Moisture | | 25.0 |
|---|---|---|
| Raw Material Rate | PPH | 128.00 |
| Feed Screw Speed | RPM | 15.0 |
| Mixing Cylinder Speed | RPM | 221 |
| Steam Flow to Mixing Cylinder | PPM | 0.0 |
| Water Flow to Mixing Cylinder | PPM | 0.0 |
| Discharge Temp. | °F. | ambient |
| Discharge Moisture | % | 25.0 |
| Shaft Speed | RPM | 407 |
| Motor Load | % | 33 |
| Zone Temperature 2nd Head | °F. | W/104 |
| Zone Temperature 3rd Head | °F. | W/104 |
| Zone Temperature 4th Head | °F. | HO/221 |
| Zone Temperature 5th Head | °F. | HO/230 |
| Zone Temperature 6th Head | °F. | HO/230 |
| Zone Temperature 7th Head | °F. | W/122 |
| Zone Temperature 8th Head | °F. | W/122 |
| Zone Temperature 9th Head | °F. | W/189 |
| Pressure - 9th Head | PSIG | 700 |
| Pressure - Die | PSIG | 900 |
| Knife Drive Speed | RPM | 6 |
| Extrudate Moisture | % | 17.9 |
| Product Rate | lbs/hr | 115.0 |
| Dryer Temperature | °C. | 154 |
| Retention Time - Top Flight | Minutes | 3.7 |
| Retention Time - Bottom Flight | Minutes | 6 |
| Retention Time - Cooling Flight | Minutes | 5.1 |

The dried extrudate was then coated with various flavorings, including taco and cheese flavorings. This was accomplished by simply spraying a conventional coating mixture on the outer surface of the dried extrudate at levels of from about 0.1 to 0.5% by weight. Portions of these sprayed products were then subjected to toasting in an ordinary kitchen toaster oven (temperature of about 250° F.) in order to crisp the surface of the products.

The dried, flavored, and toasted extrudate products were then tested and determined to have a moisture content of 4.4% by weight, and ash content of about 2.4% by weight, a protein content of about 17.7% by weight, and a fat content of about 0.5% by weight.

In addition, chicken flavored products made as outlined in this example were tested by a sensory panel for crispness, mouth feel and acceptability; and were subjected to a TBA (thiobarburic acid) rancidity test. The dried product had a crispness rating of 7.0, a mouth feel rating of 7.5, an acceptability rating of 7.5, and TBA results of 0.236. The toasted product had a crispness rating of 8.0, a mouth feel of 7.8, an acceptability of 7.9 and TBA results of 0.298. The standard error of the means in all cases was 0.1.

EXAMPLE IV

In this example, 15 extruded samples of the type described in the foregoing operative Example III were analyzed for physical properties, namely, sectional, longitudinal and volumetric expansion, bulk density, specific gravity and Instron compressibility. An additional 7 representative samples were tested for compressibility.

Section, longitudinal and volumetric expansion indices developed by Alvarez-Martinez, et al. (J. Food Sci. 53:609) were used to characterize expansion of the products obtained in this study. Sectional Expansion Index (SEI) is a measure of radial expansion of the extrudate and is the ratio of the cross-sectional area of the extrudate to the cross-sectional area of the die. Longitudinal Expansion Index (LEI) is a measure of expansion in the axial direction and is described by the following equation:

$$LEI = [A_d]L_{se}\rho_d\left[\frac{1 - MC_d}{1 - MC_e}\right]$$

where $A_d$ is the open area of the die in square meters, $L_{se}$ is the specific length of the extrudate in m/kg, $\rho_d$ is the density of the dough behind the die (assumed to be constant and equal to 1,200 kg/m$^3$, and $MC_d$ and $MC_e$ are the moisture contents of the dough and extrudate, respectively. Volumetric Expansion Index (VEI) takes into account SEI and LEI to describe the expansion on a volumetric basis (VEI=SEI×LEI). Fifteen pieces from each treatment were measured for the expansion indices and the results are shown in the table below.

Bulk density was determined by filling a one liter volume container to level full capacity with product and weighing it in grams and converting it to lbs/ft$^3$ (factor: 0.0624). Bulk Specific Gravity is defined as the weight of a given volume of product relative to the weight of an equal volume of water at 4° C. Thus, the gram/liter bulk density of the product was divided by 1,000 grams/liter bulk density of water to yield specific gravity. The results are shown in the table below.

Instron compressibility was determined with a Warner-Bratzler shear cell according to the method of Faubion and Hoseney (Cereal Chemistry 59:529, 1982). The Warner-Bratzler shear cell is attached to the Instron Universal Testing Machine and used to shear across the extruded tube perpendicular to its long axis (or perpendicular to the axial direction of extrusion). The crosshead speed was set at 5 cm/min. and the results expressed as the maximum force in Kg required to shear through the piece.

The following table sets forth the results of these tests.

| Sample # | SEI | LEI | VEI | Bulk Density lb/cu.ft | Specific Gravity | Instron Compressibility Kg force |
|---|---|---|---|---|---|---|
| 1 | 11.30 | 0.49 | 5.54 | 7.67 | 0.12 | 3.85 |
| 2 | 4.22 | 0.45 | 1.92 | 7.33 | 0.12 | 3.60 |
| 3 | 7.96 | 0.54 | 4.27 | 7.21 | 0.12 | 1.25 |
| 4 | 9.22 | 0.56 | 5.19 | 7.32 | 0.12 | 4.00 |
| 5 | 10.31 | 0.56 | 5.77 | 7.30 | 0.12 | 2.80 |
| 6 | 10.50 | 0.47 | 4.98 | 7.02 | 0.11 | 4.05 |
| 7 | 10.05 | 0.43 | 4.35 | 6.99 | 0.11 | 3.95 |
| 8 | 8.64 | 0.53 | 4.60 | 6.72 | 0.11 | 4.15 |
| 9 | 13.25 | 0.56 | 7.38 | 6.77 | 0.11 | 2.20 |
| 10 | 10.74 | 0.55 | 5.90 | 6.53 | 0.10 | 4.35 |
| 11 | 8.48 | 0.53 | 4.54 | 6.76 | 0.11 | 1.85 |
| 12 | 10.93 | 0.55 | 5.99 | 6.74 | 0.11 | 1.50 |
| 13 | 8.45 | 0.48 | 4.07 | 6.66 | 0.11 | 2.05 |
| 14 | 9.91 | 0.55 | 5.43 | 6.62 | 0.11 | 3.25 |
| 15 | 10.75 | 0.46 | 4.98 | 6.55 | 0.10 | 1.90 |
| 16 | | | | | | 1.30 |
| 17 | | | | | | 2.05 |
| 18 | | | | | | 1.75 |
| 19 | | | | | | 1.75 |
| 20 | | | | | | 1.60 |
| 21 | | | | | | 0.95 |
| 22 | | | | | | 4.45 |

Accordingly, it was determined that products in accordance with the invention should have a Sectional Expansion Index of from about 3-15, and more preferably from about 7-13; a Longitudinal Expansion Index of from about 0.3-0.7, and more preferably from about 0.4-0.6; and a Volumetric Expansion Index of from about 1.5-9, and more preferably from about 4-7.5.

We claim:

1. A method of fabricating a meat-based snack food product, comprising the steps of:
   forming a mixture including at least about 5% by weight meat, at least about 50% by weight wheat flour and a total fat content of up to about 4% by weight;
   passing said mixture into and through an extruder equipped with a flighted internal screw and an endmost die, and, during such passage, subjecting the mixture to a temperature of up to about 280° F. and superatmospheric pressures of up to about 2500 psig; and
   extruding said mixture through said endmost die to form an expanded, cellular extrudate having an as-extruded fat content of up to about 4% by weight.

2. The method of claim 1, said mixture including from about 20-40% by weight meat.

3. The method of claim 1, said mixture including from about 60-80% by weight wheat flour.

4. The method of claim 1, said meat being selected from the group consisting of beef, pork, and poultry.

5. The method of claim 4, said meat being mechanically deboned poultry meat.

6. The method of claim 1, said temperature being from about 180°-250° F.

7. The method of claim 6, said temperature being from about 210°-240° F.

8. The method of claim 1, including the step of retaining said mixture within said extruder barrel for a period of from about 10-60 seconds.

9. The method of claim 1, said pressure being from about 500-1500 psig.

10. The method of claim 1, said mixture having a total moisture content of from about 15-40% by weight.

11. The method of claim 10, said moisture content being from about 20-30% by weight.

12. The method of claim 1, including the step of drying said extrudate.

13. The method of claim 12, including the step of drying said extrudate to a final moisture content of from about 2-10% by weight.

14. The method of claim said extrudate having a specific gravity of from about 0.08-0.15.

15. The method of claim said extrudate having a bulk density of from about 5-9 pounds per cubic foot.

16. The method of claim 1, including the step of topically applying a flavoring on the surface of said extrudate.

17. The method of claim 16, said flavoring being selected from the group consisting of beef, poultry, pork, cheese, barbecue, taco and nacho flavoring.

18. The method of claim 1, said extrudate having an Instron compressibility rating of from about 1.0-5.0.

19. The method of claim 1, said extrudate having a length of at least about ⅛ inch.

20. The method of claim 1, said extrudate having a total protein content of from about 5-25% by weight.

21. The method of claim said extrudate having a total fat content of from about 0-20% by weight.

22. The method of claim 1, said extrudate having a water activity of from about 0.1-0.6.

23. An extruded snack product comprising an expanded cellular body defined by an multitude of cell-defining walls, the material making up said walls including at least about 5% by weight meat and at least 50% by weight wheat, said body having a specific gravity of from about 0.08 to 0.15, a bulk density of from about 5 to 9 pounds per cubic foot, an Instron compressibility rating of from about 1-5 Kg of force, and a total as-extruded fat content of up to about 4% by weight.

24. The snack product of claim 23, said body having a total moisture content of from about 1-10% by weight.

25. The snack product of claim 23, including a topically applied flavoring on the surface of said body.

26. The snack product of claim 23, said body having a total protein content of from about 5-25% by weight.

27. The snack product of claim 23, said body having a total fat content of from about 0-20% by weight.

28. The snack product of claim 23, said body having a total water activity of from about 0.1-0.6.

* * * * *